(12) United States Patent
Fernandez et al.

(10) Patent No.: US 11,734,381 B2
(45) Date of Patent: Aug. 22, 2023

(54) EFFICIENT DOWNLOADING OF RELATED DOCUMENTS

(71) Applicant: ServiceNow, Inc., Santa Clara, CA (US)

(72) Inventors: Rodrigo Oliveira Fernandez, San Diego, CA (US); Kyle Barron-Kraus, East Lansing, MI (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/544,703

(22) Filed: Dec. 7, 2021

(65) Prior Publication Data

US 2023/0177100 A1    Jun. 8, 2023

(51) Int. Cl.
*G06F 16/20*     (2019.01)
*G06F 16/957*    (2019.01)
*G06F 16/955*    (2019.01)
*G06F 16/9538*   (2019.01)

(52) U.S. Cl.
CPC ........ *G06F 16/9577* (2019.01); *G06F 16/955* (2019.01); *G06F 16/9538* (2019.01)

(58) Field of Classification Search
CPC . G06F 16/9577; G06F 16/955; G06F 16/9538
See application file for complete search history.

(56) References Cited

U.S. PATENT DOCUMENTS 4,941,084 A    7/1990 Terada et al.
5,185,860 A    2/1993 Wu
5,237,518 A    8/1993 Sztipanovits et al.
5,261,097 A    11/1993 Saxon
(Continued)

FOREIGN PATENT DOCUMENTS

CA    2620929 A1 * 4/2007 ........... G06F 16/957
CN    102999636 A * 3/2013
(Continued)

OTHER PUBLICATIONS

MDN Web Docs moz://a, "Using Service Workers," Nov. 13, 2021, available at https://web.archive.org/web/20211113214553/https://developer.mozilla.org/en-US/docs/Web/API/Service_Worker_API/Using_Service_Workers (retrieved Dec. 16, 2022) (Year: 2021).*

*Primary Examiner* — Shahid K Khan
(74) *Attorney, Agent, or Firm* — McDonnell Boehnen Hulbert & Berghoff LLP

(57) ABSTRACT

A server configured to provide web-based services over a network may include one or more processors configured to receive a request from a user device for access to a web-based service. In response, the server may download, to the user device, information for rendering an initial web resource by a web client of the user device, and software instructions configured to cause the web client to: intercept a web request to the server; determine, based on the web request, a main web document and ancillary web documents designated to be downloaded for rendering a particular web resource; send, to the server, the web request for the main web document and, without waiting for reception of the main web document, send respective document requests for each of the ancillary web documents; receive the main web document and the ancillary web documents; and render the particular web resource using the received documents.

17 Claims, 10 Drawing Sheets

(56) References Cited

U.S. PATENT DOCUMENTS

| | | |
|---|---|---|
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 6,993,591 B1 * | 1/2006 | Klemm ............... H04L 67/5681 709/219 |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,483,941 B2 * | 1/2009 | Carlson ............... G06F 16/9574 709/217 |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,694,008 B2 * | 4/2010 | Chang ............... G06F 16/9574 710/110 |
| 7,797,376 B1 * | 9/2010 | Desai ............... H04L 67/5681 709/213 |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B1 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,549,099 B2 * | 10/2013 | Sebastian ............... G06F 40/211 380/54 |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 8,984,048 B1 * | 3/2015 | Maniscalco ............ G06F 16/951 709/201 |
| 9,053,460 B2 | 6/2015 | Gilbert et al. |
| 9,106,607 B1 * | 8/2015 | Lepeska ............... H04L 67/5681 |
| 9,639,629 B1 * | 5/2017 | Venkat ............... G06F 16/80 |
| 10,291,738 B1 * | 5/2019 | Jaiswal ............... H04L 67/5681 |
| 10,320,934 B1 * | 6/2019 | Ghosh ............... H04L 67/53 |
| 10,673,963 B1 | 6/2020 | Feiguine et al. |
| 10,749,943 B1 | 8/2020 | Feiguine et al. |
| 10,771,344 B2 | 9/2020 | Bitterfeld et al. |
| 10,824,650 B2 | 11/2020 | Bar Oz et al. |
| 10,944,654 B2 | 3/2021 | Rimar et al. |
| 11,089,115 B2 | 8/2021 | Garty et al. |
| 11,095,506 B1 | 8/2021 | Erblat et al. |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2005/0154781 A1 * | 7/2005 | Carlson ............... G06F 16/9574 711/137 |
| 2006/0020598 A1 * | 1/2006 | Shoolman ............ H04L 67/1001 |
| 2006/0026453 A1 | 2/2006 | Frost et al. |
| 2006/0069618 A1 * | 3/2006 | Milener ............... G06F 16/9577 707/E17.121 |
| 2006/0095461 A1 | 5/2006 | Raymond |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088875 A1 | 4/2009 | Baier et al. |
| 2009/0228984 A1 | 9/2009 | Sterin |
| 2010/0110932 A1 | 5/2010 | Doran et al. |
| 2010/0146415 A1 * | 6/2010 | Lepeska ............... H04L 61/58 715/760 |
| 2011/0185017 A1 * | 7/2011 | Rezaiifar ............... G06F 16/957 709/203 |
| 2012/0030305 A1 * | 2/2012 | Marquess ............ G06F 16/9574 709/213 |
| 2014/0053057 A1 * | 2/2014 | Reshadi ............... G06F 16/9574 715/234 |
| 2015/0142874 A1 * | 5/2015 | He ............... H04L 67/02 709/203 |
| 2016/0094612 A1 * | 3/2016 | Lockhart ............ G06F 16/9577 709/217 |
| 2018/0123940 A1 | 5/2018 | Rimar et al. |
| 2019/0095196 A1 * | 3/2019 | Anderson ............ G06F 8/71 |
| 2019/0104398 A1 | 4/2019 | Owen et al. |

(56) References Cited

U.S. PATENT DOCUMENTS

2020/0050689 A1  2/2020  Tal et al.
2020/0204443 A1  6/2020  Bar Oz et al.
2021/0194764 A1  6/2021  Badyan et al.

FOREIGN PATENT DOCUMENTS

| CN | 107977371 A * | 5/2018 | |
| CN | 110287432 A * | 9/2019 | ......... G06F 16/9574 |
| CN | 112783451 A * | 5/2021 | ........... G06F 16/955 |
| EP | 0433979 | 6/1991 | |
| EP | 1607824 | 12/2005 | |
| EP | 1886470 B1 * | 9/2016 | ....... G06F 17/30902 |
| JP | 2001265641 A * | 9/2001 | ............. H04L 67/02 |
| JP | 2011141867 A * | 7/2011 | |
| WO | WO 99/34285 | 7/1999 | |
| WO | WO 00/52559 | 9/2000 | |
| WO | WO 01/79970 | 10/2001 | |
| WO | WO-2006085314 A2 * | 8/2006 | ....... G06F 17/30902 |
| WO | WO-2010081160 A2 * | 7/2010 | ............. G06F 17/30 |
| WO | WO-2012159360 A1 * | 11/2012 | ....... G06F 17/30902 |
| WO | WO-2015153677 A1 * | 10/2015 | ........... G06F 17/272 |

* cited by examiner

EFFICIENT DOWNLOADING OF RELATED DOCUMENTS

BACKGROUND

Modern computing platforms may support applications that include various types of graphical user interfaces (GUIs). In some applications, user devices may access one or more network servers for various network services, and download associated resources for graphical rendering in GUIs of the user devices. Network resources may include multiple components that need to be downloaded to support rendering. Conventional approaches to downloading resources involve discovery and/or or identification of resource components on an "as-needed" basis during the course of rendering, followed by actions taken to download the as-needed components. As a consequence, the rendering process may be subject to start-and-stop delays and/or interruptions while it waits for resource components to download.

SUMMARY

The embodiments herein provide systems and methods for enhancing performance of downloading resource components of a network resource to a user device for graphical rendering. In particular, during an initial communication, a network server may download software instructions to a user device that, when executed by a GUI application of the user device, may enable the GUI application to discover and/or identify multiple components of a given network resource when first requesting the given network resource from a network server. Doing so allows the user device to download and cache the multiple components before the rendering begins. Then, as the GUI application determines the need for various resource components for rendering, the components may be retrieved nearly instantly from cache or other prior storage.

Example embodiments herein are described in terms of web-based services provided by network servers, such as web servers. In this context, network services may be considered web-based services, and network resources may be considered web resources. A web resource may include, or be made up of, multiple, related web documents, such as a main web document and one or more ancillary web documents. Additionally, a GUI application of a user device may be, or include, a web client. Non-limiting examples of web-based services, web resources, and web clients may include websites, web pages, and web browsers, respectively. In some instances and/or deployments, a web page may be considered as encompassing multiple web resources. Non-limiting examples of a main web document and ancillary web documents may include a parent web document and one or more child web documents. The embodiments described herein should not be viewed as limiting with respect to other possible applications, implementations, and/or deployments of the systems and methods presented by way of example.

Accordingly, a first example embodiment may involve a system comprising: a server configured to provide web-based services via communicative connections over a network; and one or more processors configured to: receive, from a user device and by way of the network, an initial request for initial access to a particular web-based service; and responsive to the initial request, download to the user device a reply comprising (i) information for rendering an initial web resource by a web client of the user device, and (ii) software instructions that, when executed by the web client, cause the web client to: intercept a web request issued to the server, based on the web request, determine a main web document and one or more ancillary web documents designated to be downloaded for rendering a particular web resource associated with the web request, send, to the server, the web request for the main web document and respective document requests for each of the one or more ancillary web documents, wherein the respective document requests are sent without waiting for reception of the main web document, receive, from the server, the main web document and the one or more ancillary web documents, and render the particular web resource using the main web document and the one or more ancillary web documents.

A second example embodiment may involve a computer-implemented method comprising: at a server configured to provide web-based services via communicative connections over a network, receiving, from a user device and by way of the network, an initial request for initial access to a particular web-based service; and at the server, responsive to the initial request, downloading to the user device a web reply comprising (i) information for rendering an initial web resource by a web client of the user device, and (ii) software instructions that, when executed by the web client of the user device, cause the web client of the user device to: intercept a web request issued to the server, based on the web request, determine a main web document and one or more ancillary web documents designated to be downloaded for rendering a particular web resource associated with the web request, send, to the server, the web request for the main web document and respective document requests for each of the one or more ancillary web documents, wherein the respective document requests are sent without waiting for reception of the main web document, receive, from the server, the main web document and the one or more ancillary web documents, and render the particular web resource using the main web document and the one or more ancillary web documents.

In a third example embodiment, an article of manufacture may include a non-transitory computer-readable medium, having stored thereon program instructions that, upon execution by a computing system configured to provide web-based services via communicative connections over a network, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
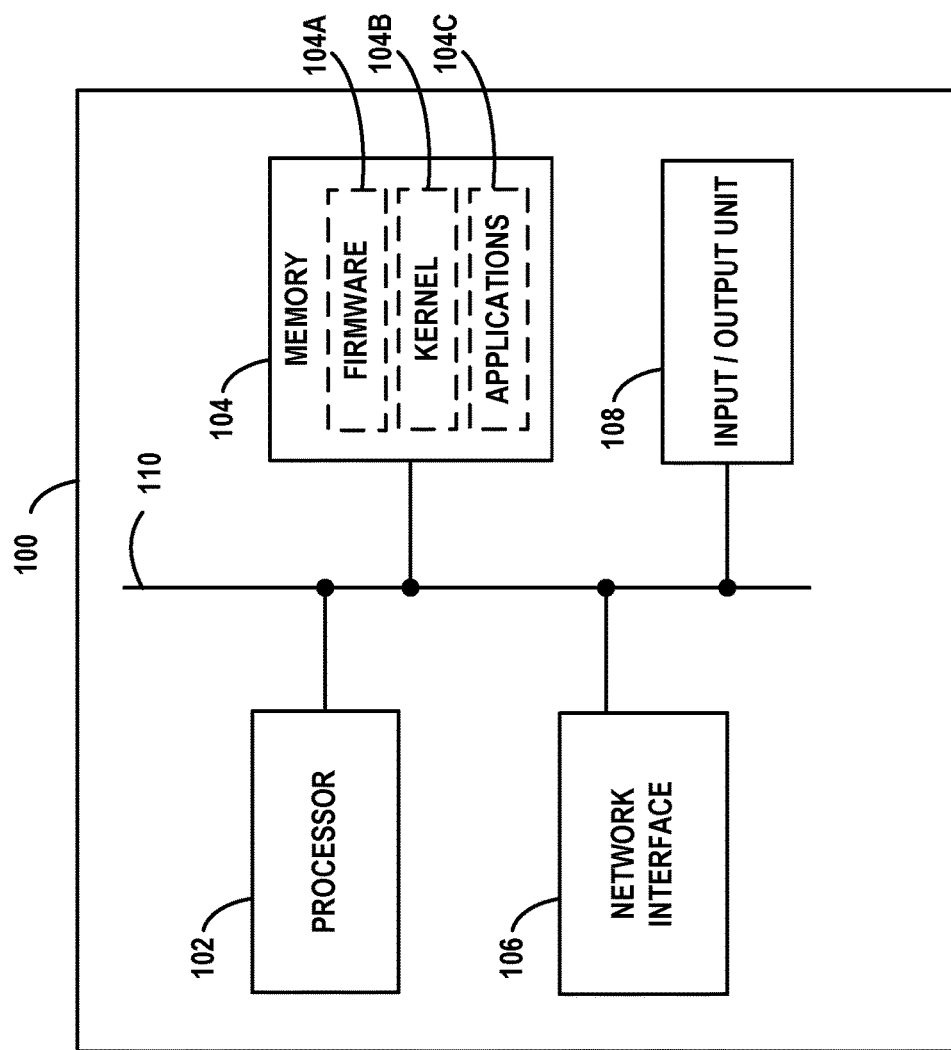
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

The following discussion is presented, by way of example, in the context of a large enterprise. It should be understood that the various architectural and operational principles of example embodiments herein are not limited by this exemplary context. Nor are the various architectural and operational principles of example embodiments constrained to apply to a large enterprise. Rather, example embodiments may apply and/or extent to any usage scenario involving a web client or the like requesting a web-based service from a server.

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The MVC architecture discussed by way of example herein should not be viewed as limiting with respect to example embodiments. Other architectural paradigms may be possible as well, such as unidirectional data-flow.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling, and management of processes, input/output, and communication. Kernel 104B may also include device drivers that allow the operating system to communicate with the hardware modules (e.g., memory units, networking interfaces, ports, and buses) of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
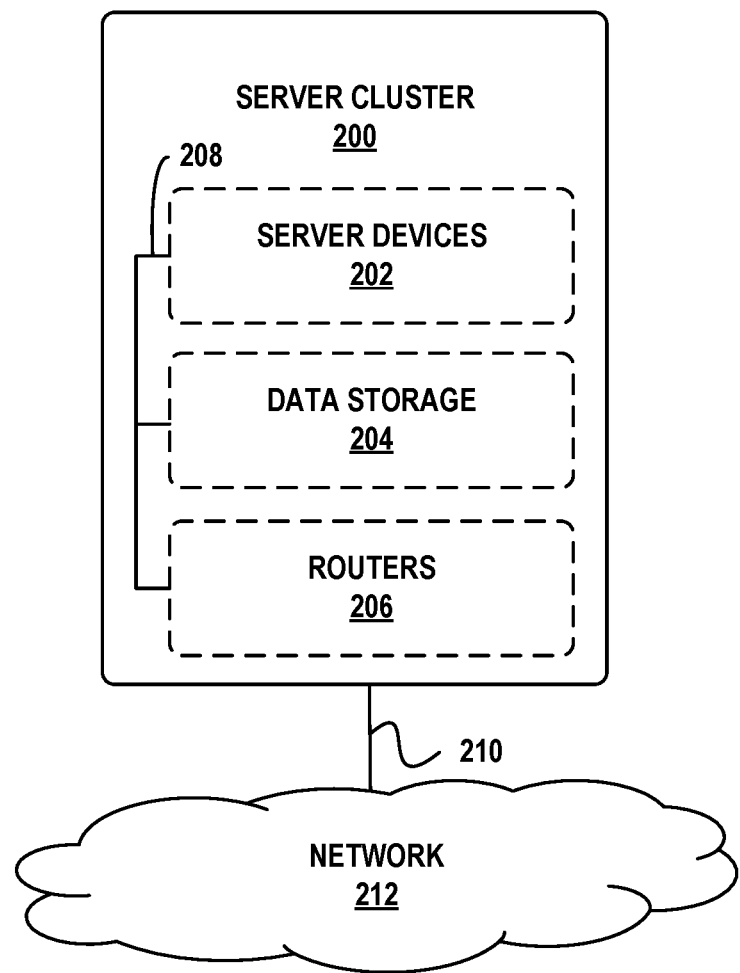
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
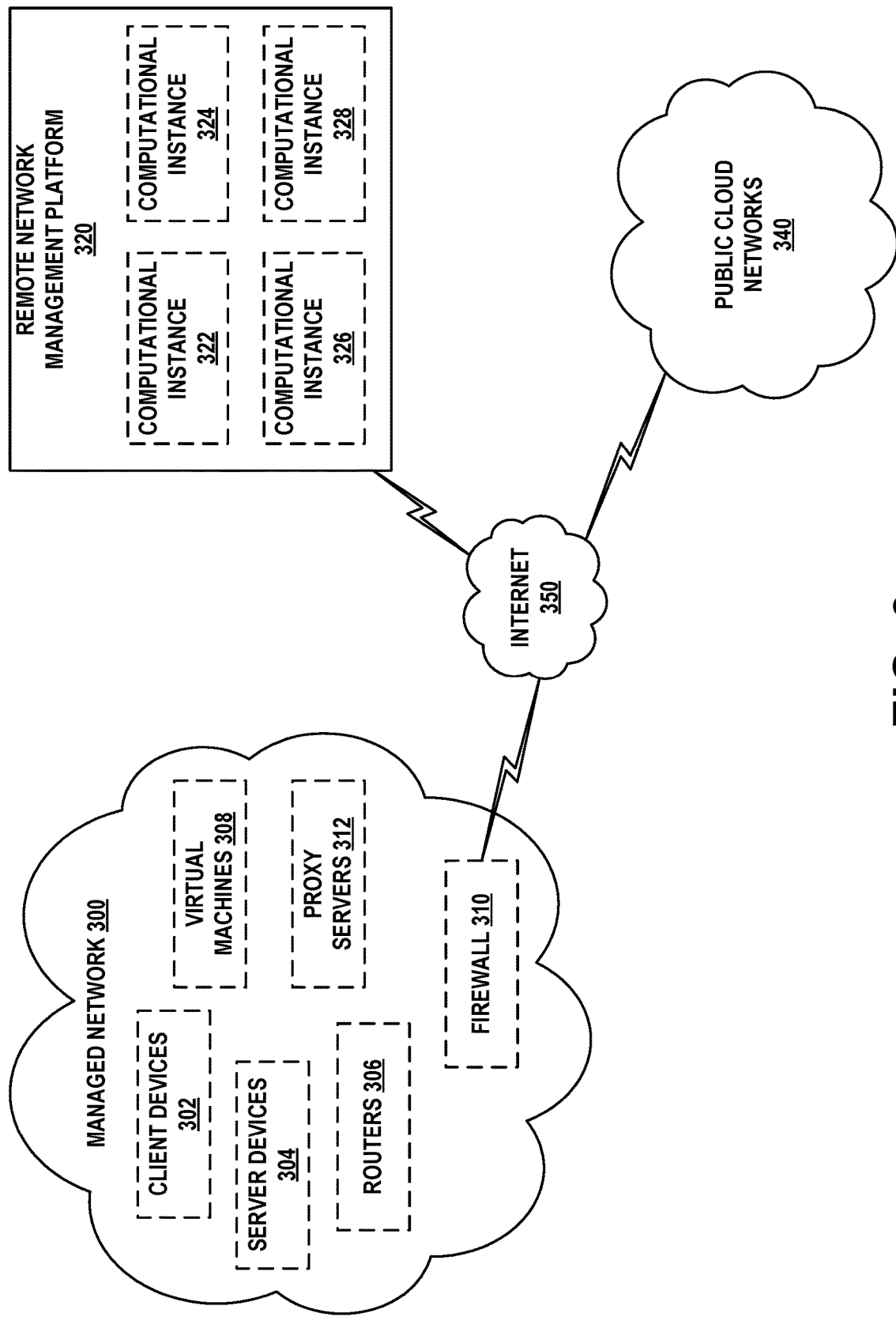
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
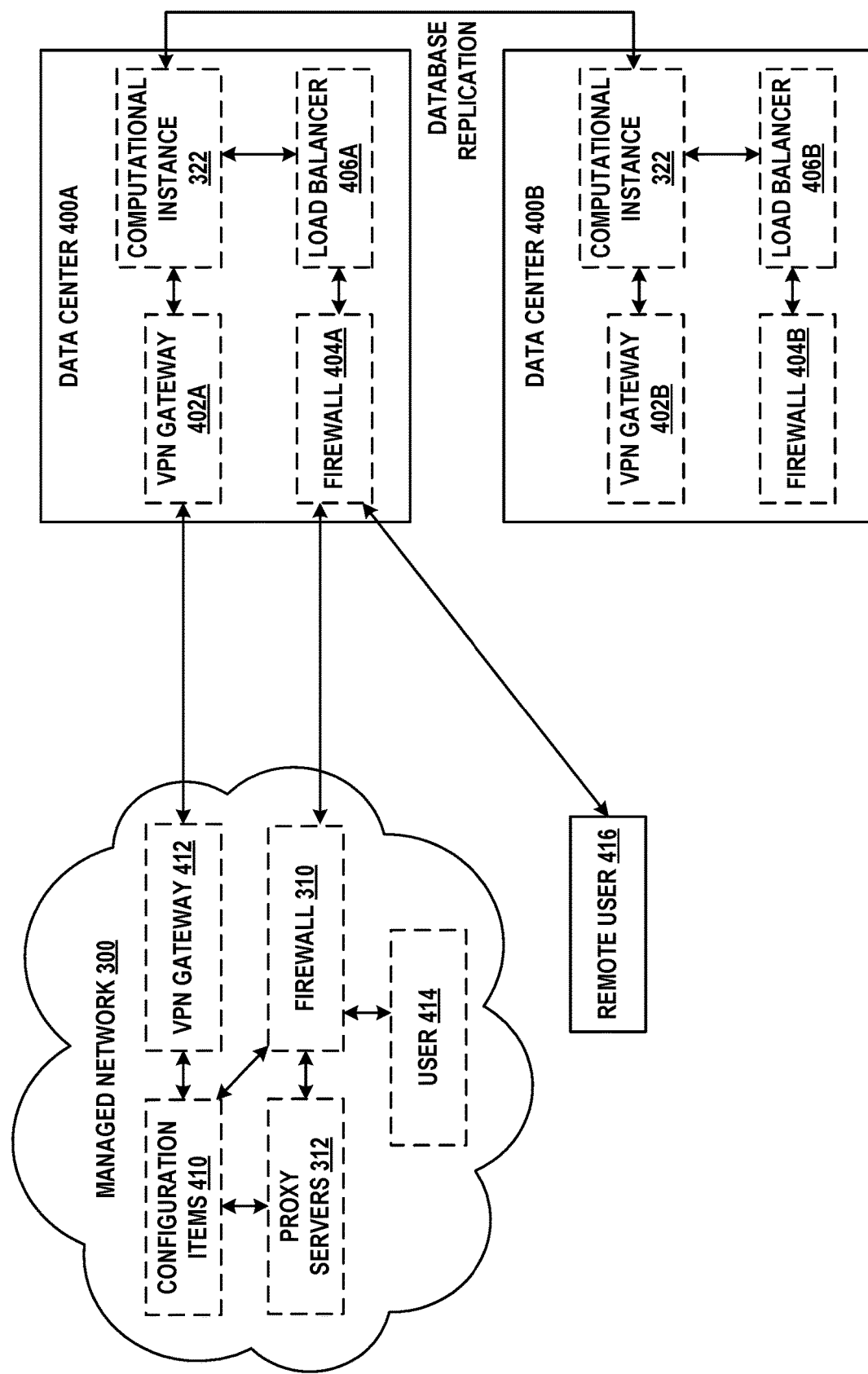
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
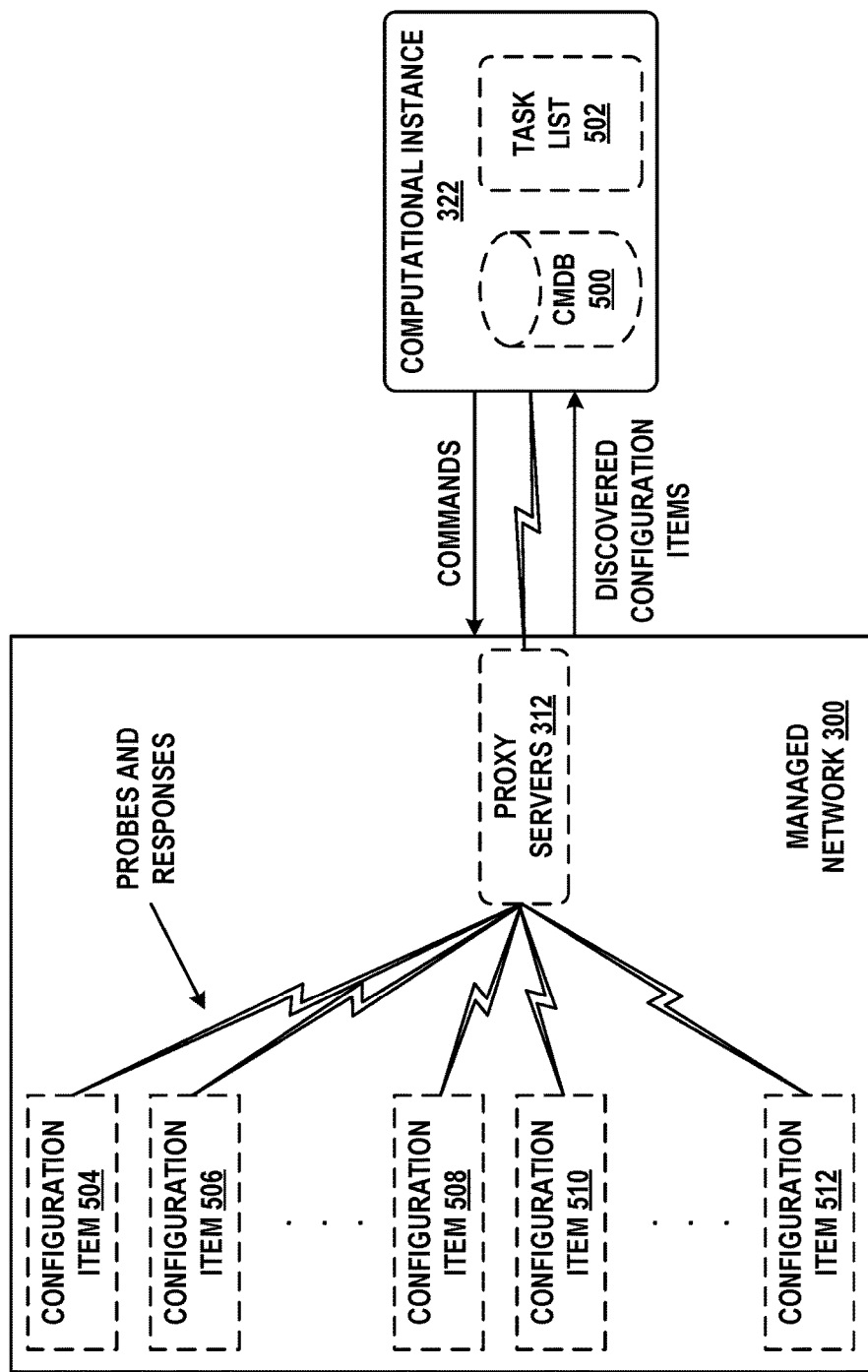
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
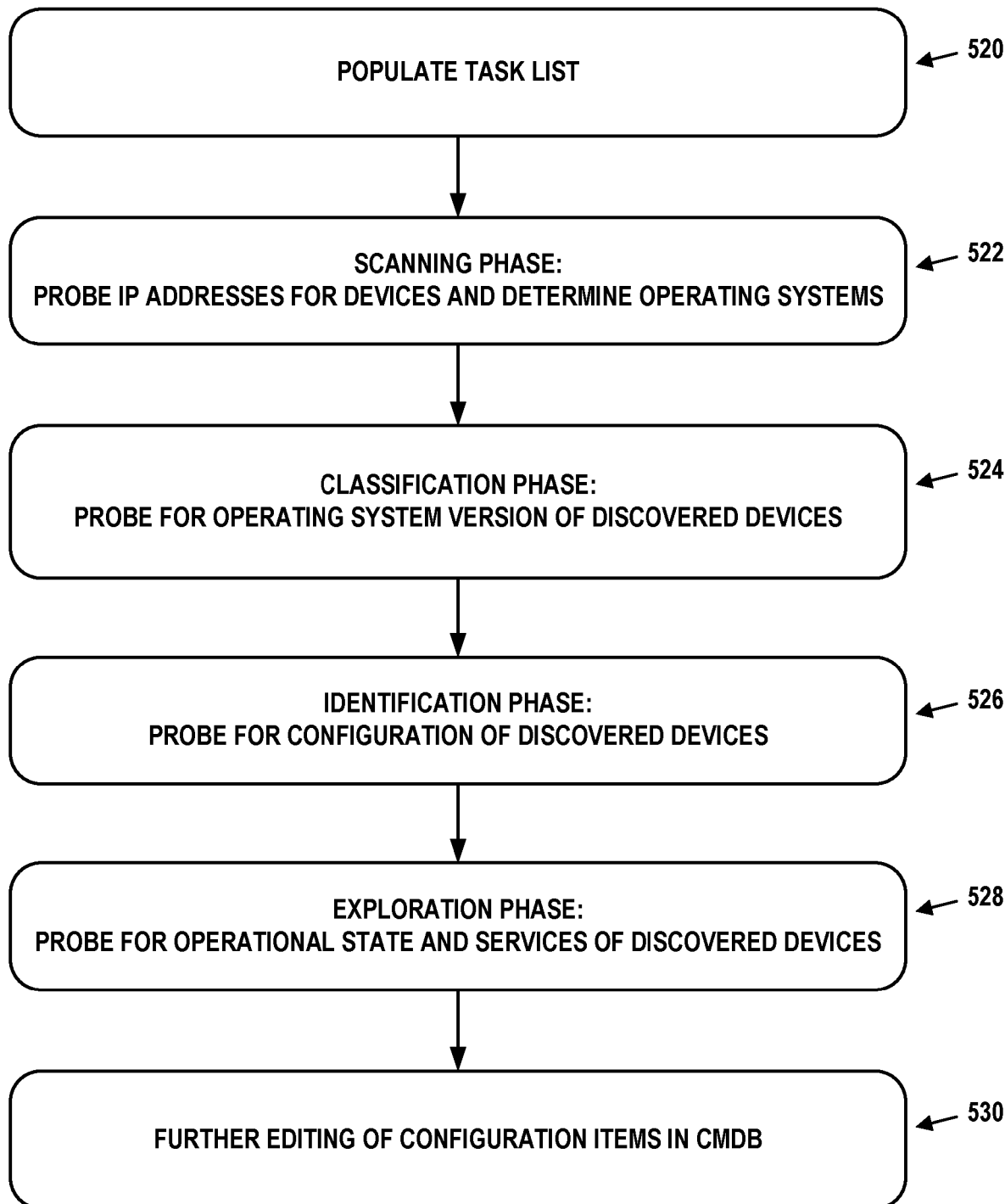
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Enhanced Performance of Downloading of Related Web Documents

A web client of a user device may access a web resource of a web server by issuing a web request to the web server via a communicative connection over a network. The web request may be or include a network address of the web resource (e.g., the web server's network address), and resource information further identifying the web resource. By way of example, a web client could be a web browser, and a web resource could be a web page. Also by way of example, the web request could be or include a uniform record locator (URL). In reply to a web request, a web server may download a web document encoding content for display and data specifying to the web client how the web resource should be rendered in a display of the user device. As a non-limiting example, a web document may be encoded using hypertext mark-up language (HTML).

The web client of a user device may be or include a software application program configured for interpreting the encoded web documents, and rendering them in or as the web page. By way of example, a web client, such as a web browser, may be implemented using instructions specified according to a programming language, such as Javascript. However, other programming languages could be used. Further, one or more portions of a web client may be or include instructions encoded in hardware and/or firmware of a user device.

In practice, a web resource may include, or be made up of, multiple web documents corresponding to different graphical and content components of the web resource. A typical arrangement may include a main web document and one or more ancillary web documents. The web documents that make up a web resource may be related hierarchically, though not necessarily. For example, the ancillary web documents may be child documents of the main web document, and some ancillary web documents could be child documents of other ancillary web documents. Other arrangements and/or relationships between web documents of a web resource are possible as well. In the illustrative examples discussed herein, multiple hierarchical levels of parent-child web documents are not explicitly considered. However, there is no loss in generality with respect to example embodiments by this omission.

Figure 6:
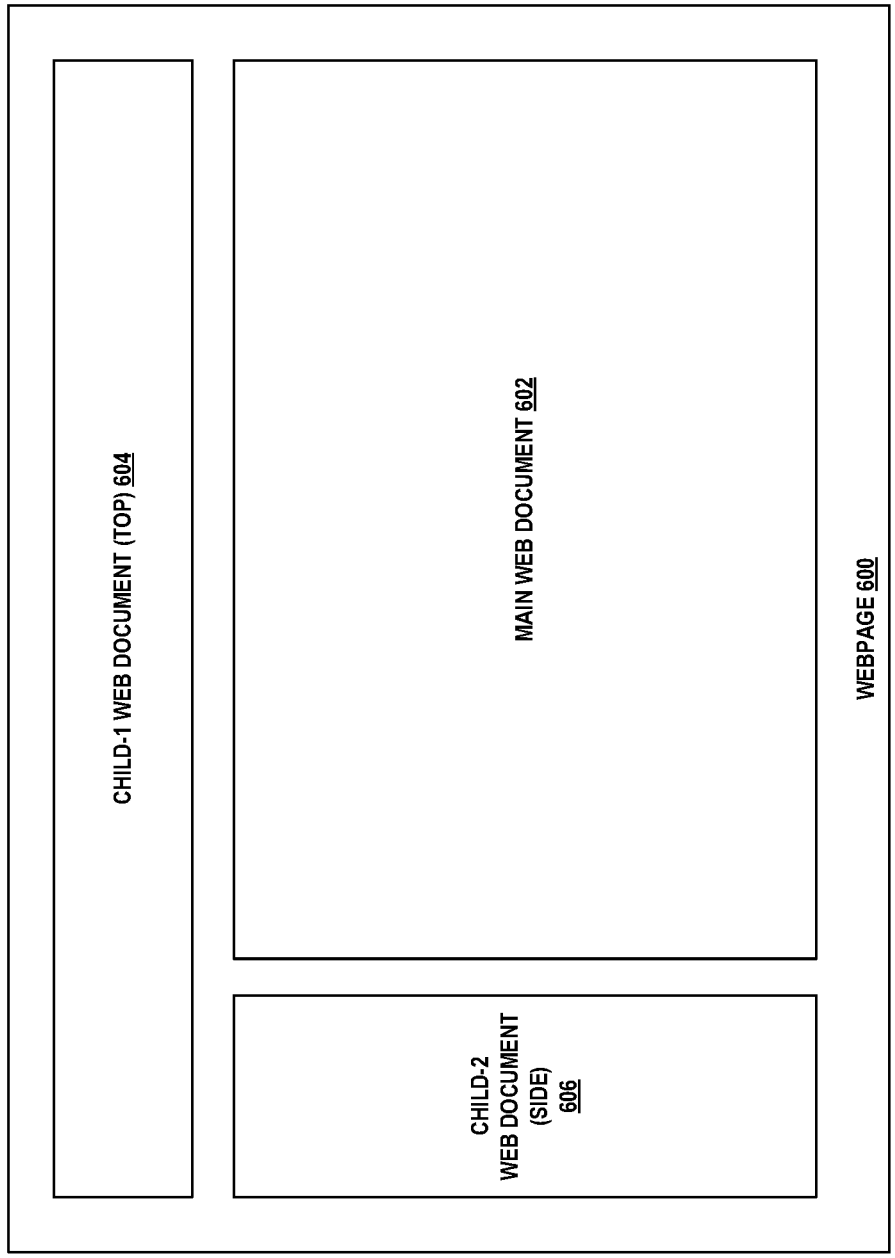
FIG. 6 illustrates example layout of an example web page, in accordance with example embodiments.

FIG. 6 illustrates an example arrangement of component web documents for a web page as an example web resource. As shown in this simplified illustration, a web page 600 that includes a main web document 602, a first child-1 web document 604, and a second child-2 document 606. For purposes of illustration, and by way of example, the main web document 602 occupies a major portion of the web page 600, while the child-1 web document 604 occupies a top portion of the web page 600, and the child-2 web document 606 occupies a left-side portion of the web page 600. Each web-document component may be encoded in HTML, for example. By way of example, the child web documents 604 and 606 in FIG. 6 are rendered in graphical locations outside of the rendered main web document 602. However, child web documents may also be rendered at graphical locations that are inside the main web document.

Each of the web documents of a web resource may be identified according to a network address and resource information about the web document. For example, a main web document and child web documents of a web resource may each be identified by a URL. As such, a web client may retrieve each web document by sending its URL to a web server, for example. The web server may then respond by downloading the associated web document to the web client. For the example shown in FIG. 6, the main web document 602, the first child-1 web document 604, and the second child-2 document 606 may each be associated with a respective URL that may be used by a web client to identify the associated web document and request its download from a web server.

In a typical example arrangement, a main web document may include addresses or links, such as URLs, to one or more child documents. The addresses or links may be embedded in the code or instructions of the main web document such that they are identified (or discovered) by a web client in the course of rendering the main web document. In this way, the web client may access the child web documents on an as-needed basis while rendering the main web page. Similarly, a given child web document may include one or more embedded addresses or links, such as URLs, to further child documents, and the web client may correspondingly identify these embedded links in the course of rendering the given child web document.

A. Conventional Operation

Figure 7:
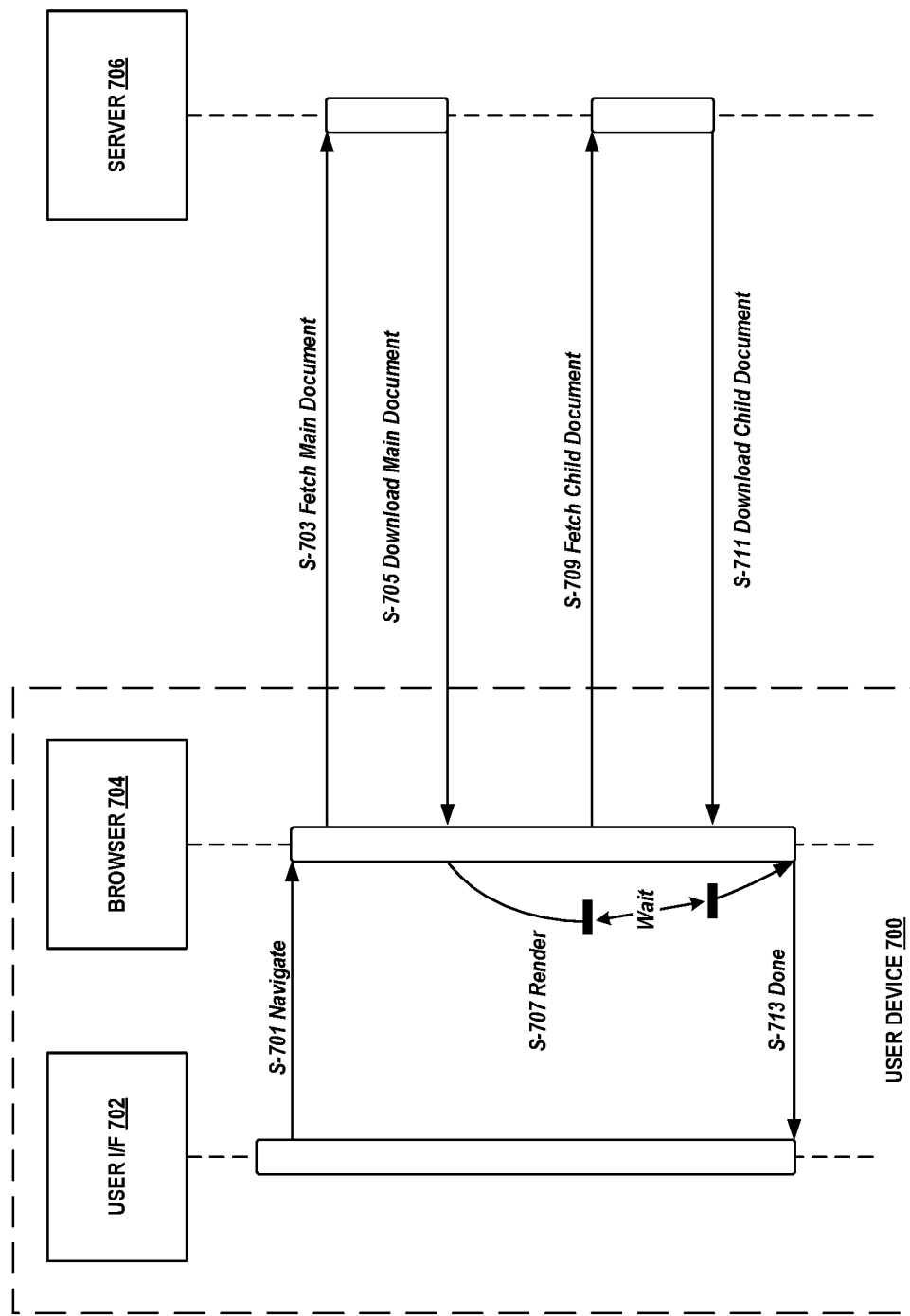
FIG. 7 illustrates an example of conventional download of web resources to a user device.

In conventional operation of rendering a web resource, such as a web page, a web client may not only identify and access web documents on an as-needed basis, it may also download the identified web documents on an as-needed basis. As a consequence, the actual rendering process may be interrupted and/or delayed as the web client requests each identified web document from a web server, and then waits for the requested web document to be downloaded. An example of conventional operation is shown in FIG. 7 in the form of a message flow diagram between various elements. By way of example, the message flow in FIG. 7 applies to web page rendering by a browser (e.g., web client) of a user device.

More specifically, in the illustration in FIG. 7 depicts as elements, a user device 700 that includes a user interface (I/F) 702 and a browser 702, and which may communicate with a server 706. The user I/F 702 may be considered means by which a user can interactively engage with the user device 700. Example means may include an interactive display device (e.g., display screen), keyboard, and mouse, as well as other possible components described above. In a typical usage scenario the server may be located remotely from the user device, and a communicative connection between them may be carried over a network, such as a public interne, for example. However, other arrangements, such as communication over a local area network (LAN), are possible as well. In the message flow diagram, a respective vertical timeline extends downward from each element, and messages between the elements are represented with directed, horizontal arrows between the vertical timelines. Relative vertical positions of the messages (arrows) signify their temporal sequencing, with time increasing downward. The vertical distances between different pairs of messages, while not necessarily being precise or specific measures of time, can be taken as indications of relative amounts of time between the different pairs.

As shown, the user I/F 702 may send a message S-701 to the browser 702 to navigate to a particular web page. For example, a user may click on a web link or type in a command to navigate to the particular web page. The browser 702 may then issue a web request S-703 to the server 706 to fetch the main web document associated with the particular web page. The web request may be or include a URL, for example. The server 706 may respond in message S-705 by downloading the main web document to the browser 704. The time between the receipt by the server 706 of the web request S-703 and receipt by the browser 704 of the downloaded main document in message S-705 may correspond to processing time at the server 706 and the transmission time of the download. In practice, this time might range on the order to 2-5 seconds, though this is just an example.

Once the browser 706 has received the main document, it may begin rendering the web page as indicated by the curved arrow labeled S-707. Evidently, and by way of example, during the course of rendering, browser may determine that a child document is needed. For example, the main document may include a URL associated with the child document. The browser may then, in accordance with conventional operation, undertake to fetch the child document by issuing a request S-709 to the server 706.

At this point, the rendering procedure may be interrupted, as indicated by a break in the curved arrow. The browser 704 may then wait for the server 706 to download the child document, the completion of which is shown in step S-711. The time between the receipt by the server 706 of the fetch request S-709 for the child document and receipt by the browser 704 of the downloaded child document in message S-711 may again correspond to processing time at the server 706 and the transmission time of the download. This time might also range on the order to 2-5 seconds, though this is just an example. The interruption of the rendering procedure is indicated by a gap labeled "Wait" in the curved arrow.

Once the browser 706 has received the child document, it may complete rendering the web page as indicated by the resumption of curved arrow labeled S-707. Upon completion of rendering, the web page may then be displayed in the user I/F 702, and indicated by the "done" message S-713.

This example of conventional operation includes two document downloads. The total amount time from the navigate request S-701 to completion S-713 therefore includes the sum of the two downloads, with the second down interrupting the rendering procedure. For typical scenarios in which a main document includes or points to multiple child or ancillary documents, conventional rendering operation may incur multiple interruptions. As a consequence, the total time it takes for a web page to appear fully rendered in user interface may become inconveniently and/or unacceptably long. The actual amount of time deemed inconvenient and/or unacceptable may be a subject matter of user experience. However, various studies involving actual users and how they respond or behave in the face of performance delays may provide guidance in this regard. Some particular usage scenarios may have more objective measures of delay tolerance. In any case, delays tied to interruptions inherent in conventional rendering and downloading are clearly at least undesirable. Systems and methods disclosed by way of example herein provide for avoiding and/or eliminating these undesirable delays.

B. Enhanced Operation and Pre-Fetching of Related Web Documents

In accordance with example embodiments, a server may download to a web client software code, or other form of computer-executable instructions, that is configured to enable the web client to determine, prior to rendering a web resource, if multiple web documents will be needed for rendering the web resource, and if so, to identify them ahead of time. More specifically, the software code may be configured, when executed by the web client (or user device), to intercept subsequent web requests from the web client to the server for web resources, and based on the web requests, make determinations of web documents that will be needed for rendering the web resources.

The software code may further be configured to enable the web client to download the multiple web documents before rendering the web resource, such that as the web documents are eventually identified during rendering, they will have already been downloaded and made available without delay to the web client's rendering procedure. Downloading web documents ahead of time (prior to beginning rendering), such that they are made available at the web client before they are needed, is referred to herein as "pre-fetching" of web documents. By downloading and implementing (e.g., instantiating), and executing, the software code that enables identification and pre-fetching of web documents, the web client may therefore be able to avoid and/or eliminate the downloading delays otherwise incurred, as described above, by the conventional procedures and/or methods.

In accordance with example embodiments, the software code may be downloaded in response, and/or as part of a response, to an initial access request by a web client to a server, such as a web server. For example, a web server may provide one or more web-based services to subscriber-users that involve an initial log-in and/or authentication transaction between web clients of subscriber-users and the web server. As part of successful completion of the log-in transaction, the web server may provide the software code that enables subsequent web requests from web clients to the web server to benefit from the pre-fetching of web documents.

By way of further example, in the context of a managed network, such as that described above, subscriber-users may be users who are authorized to access the managed network, including various web services that may be provided. When such a subscriber-user logs into, or otherwise connects to, the network via a web client on a user device, the web client may seek initial access to a web server of the network. In addition to, or as part of, authenticating the subscriber-user, the web server may download the pre-fetching software to the web client. Upon activating, in one fashion or another, the downloaded software, the web client may invoke the pre-fetching capabilities on subsequent web requests to some or all web services of the managed network. Subscriber-users may accordingly enjoy fewer and/or shorter delays (if any) as their web clients access the web services and render web resources as part of that access. The above example of subscriber-user access to a managed network should not be viewed as limiting with respect to other possible applications pre-fetching operations and embodiments described herein.

In accordance with example embodiments, the software code, or other form of computer-executable instructions, may be configured for execution by a web client as a distinct or separate thread from one or more other operational threads of the web client. With this arrangement, the downloaded software code may be configured, when executing on the user device, to intercept web requests issued by the web client to the web server. Upon intercepting a given web request, the software code may execute to determine and/or identify, based on the intercepted web request, a main web document and one or more ancillary web documents. As described above by way of example, ancillary documents could be child documents. Once the web documents are identified, the software code may execute to send requests to the web server for the identified web documents. For example, requests may be sent by way of transmissions from a network interface of the user device.

In some embodiments, the downloaded software code may be configured to execute within a context of an existing thread of the web client. For example, it may be directly invoked by the web client when it issues a web request to the web server for a web resource. Other implementation configurations are possible as well.

In further accordance with example embodiments, the requests may be sent one after another, without waiting for any one or more of the documents to be downloaded from the server, and/or without beginning the rendering procedure. That is, the web documents identified by intercepting the web request may be pre-fetched, before the rendering procedure begins. In addition, upon being downloaded (e.g., pre-fetched) from the web server, the web documents may be stored in cache memory or other form of local storage accessible by the web client. Thus, as the web client eventually (and also) identifies the web documents during the rendering procedure, they will be nearly instantly available from cache memory or other local storage.

In accordance with example embodiments, a main web document and one or more ancillary (e.g., child) documents may be identified based on an intercepted web request by evaluating and/or decoding the web request. For example, a web request that is or includes a URL may encode a main web document as well as information that directly or indirectly identifies one or more child documents. As a simple example, consider a hypothetical URL of the form:

"https//example.abcxyz.com/here/now/star/goto_list.do"

The main document may be identifiable as

"https//example.abcxyz.com/here/now/star/"

and a child document is identifiable as

"https//example.abcxyz.com/goto_list.do"

Thus, both the main document and the child document may be identified by decoding the URL, and both may then be pre-fetched before rendering begins.

In further accordance with example embodiments, ancillary and/or child documents may be identified in a list that may be downloaded to a web client from a web server upon initial access to the web server. For example, this may be the same initial access that causes the software code to be downloaded to the web client. A list of ancillary and/or child documents could be included in the downloaded software code. Ancillary and/or child documents identified in a list may include additional information that associates each document with one or more particular main documents, such that when a web request (e.g., URL) is intercepted by the executing thread of the downloaded software code, a main document may be identified directly, and one or more child document may be further identified by consulting the list.

Figure 8:
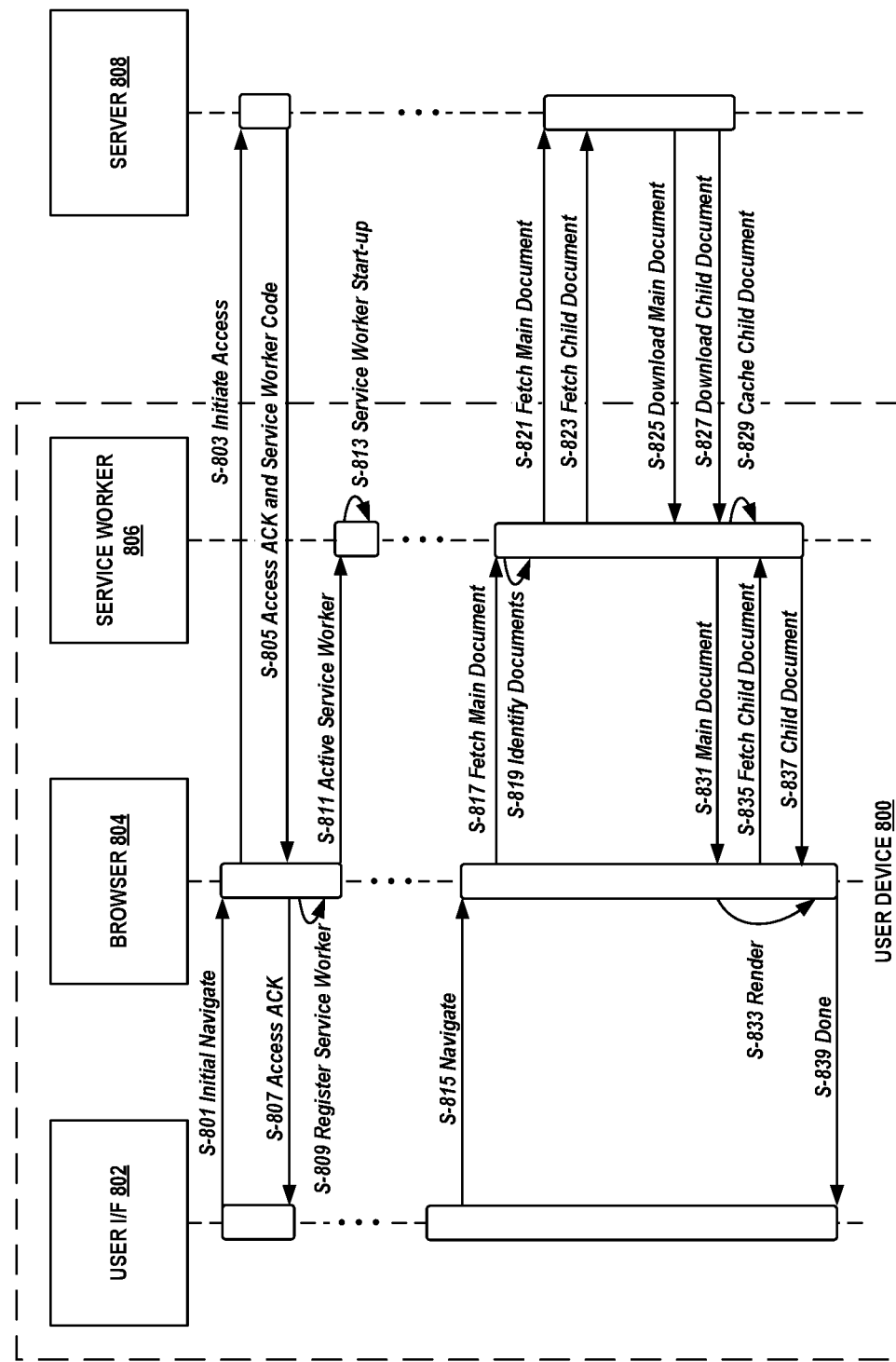
FIG. 8 illustrates an example of efficient download of web resources to a user device, in accordance with example embodiments.

FIG. 8 illustrates an example operation of pre-fetching web documents, in accordance with example embodiments. As with the illustration in FIG. 7, the example operation in FIG. 8 depicts a message flow diagram. Also by way of example, the operation in FIG. 8 is shown for web page rendering by a web browser of a user device. With this arrangement, the software code configured for causing operation to intercept web requests, and identify and download web documents associated with the web request, may be implemented as an executable entity or component sometimes referred to as a "service worker." For example, various standard programming frameworks for browsers and other web clients may include application program interfaces (APIs) that support creation of service workers. In accordance with example embodiment, a service worker may be implemented as a separate and/or distinct thread of operation of a browser or other web client.

The basic format of the message flow of FIG. 8 is the same as that of FIG. 7, with the addition of a service worker. More specifically, FIG. 8 depicts as elements a user device 800 that includes a user interface (I/F) 802, a browser 802, and a service worker 806. The user device 800 may have a communicative connection with a server 808. The user I/F 802 may be considered means by which a user can interactively engage with the user device 800. Again, example means may include an interactive display device (e.g., display screen), keyboard, and mouse, as well as other possible components described above. In a typical usage scenario the server may be located remotely from the user device, and a communicative connection between them may be carried over a network, such as a public internet, for example.

As shown, the user I/F 802 may send an initial navigate message S-801 to the browser 802 to gain initial access to the server 808. For example, a user may click on a web link or type in a command log into one or more services provided by the server 808. Other examples of initial access requests are possible as well. The browser 802 may then issue an initiate access request S-803 to the server 808 to start the initial access procedure.

It should be understood that there could be a variety of different scenarios involving different types of initial access. Non-limiting examples could range from log-in/authentication procedures, to simply starting up a user device that is pre-authorized to connect to network includes the server. In the present example context, the initiate access request S-803 may be considered as representing any such initial access request/procedure in a generic fashion. For the purposes of illustrating example operation, prior to issuing the initiate access request S-803, the browser 804 may be considered to be operating in a pre-service-worker state, without a service worker thread or corresponding software.

The server 808 may next respond to the browser 804 with a message S-805 including an access ACK and service work code. The access ACK may be returned to the user I/F 802 in message S-807 to present confirmation to a user, for example. In keeping with the illustrative generic initialization description, the access ACK may represent any appropriate form of initial access completion, such as completion of a log-in/authentication transaction, or even just a simple acknowledgement that may include an initial basic web page, for example. The service worker code in the response may be a download of one or another form of software source code in a standard format and/or language, such as Javascript, for example.

At step S-809, the browser 804 may register the service worker code, and then at step S-811, it may activate the service worker code, causing the service worker 806 to start up at step S-813 and begin executing as a separate operational thread, for example. At this point the service worker 806 is ready to carry out its various functions and operations, in accordance with example embodiments.

As shown, at some time following start-up of the service worker 806, the user I/F 802 may send a message 5815 to the browser 804 to navigate to a particular web page. (The vertical ellipses below each component after S-813 may be taken to represent an arbitrary passage of time following start-up of the service worker 806.) For example, a user may click on a web link or type in a command to navigate to the particular web page. The browser 802 may then issue a web request S-817 to the server 808 to fetch the main web document associated with the particular web page. The web request may be or include a URL, for example.

With service worker 806 active, the service worker thread may intercept the web request S-817, and at S-819 the service worker thread may evaluate, decode, or otherwise determine, based on the web request, the web documents that will be needed to render the web page associated with the web request S-817. Now, instead of fetching only the main web document, as is done conventionally by a browser acting alone and without the benefit a service worker, the service worker 806 sends requests to the server 808 for all of the web documents identified at step S-819. By way of example in the current illustration, just two web documents—a main document and a child document—are identified. Thus, the service worker sends requests to fetch the main document and the child document at steps S-821 and S-823, as shown. The requests are sent one after the other, without waiting for a reply from the server 808 to the first request.

At steps S-825 and S-827, the server 808 may respond by downloading the main web document and the child web document to the service worker 806. The time between the receipt by the server 808 of the requests for the main web document and the child web document and receipt by the service worker 806 of the downloaded main and child documents in at steps S-825 and S-827 may correspond to processing time at the server 808 and the transmission time of the download. In practice, this time might range on the order to 2-5 seconds, though this is just an example. However, unlike in conventional operation, both documents may be downloaded nearly at once.

At step S-829, the service worker 806 may cache the child document in local memory of the browser 804, for example. Then, at step S-831, the service worker 806 may provide the main web document to the browser 804, which may begin rendering the main web document at step S-822.

During the course of rendering, browser may determine that the child document is needed. For example, the main document may include a URL associated with the child document. The browser may then undertake to fetch the child document by issuing a request S-835 to the server 808. Again, the service worker 806 intercepts the request and, unlike in conventional operation, may return the child document directly from cache memory a step S-837. The browser 806 may thus resume the rendering process with almost no delay because of the immediate availability of the child document. Finally, at step S-839, the rendering procedure is complete, and the fully rendered web page may be presented in the user I/F 802.

This example intelligent pre-fetching operation includes just two document downloads. Because both web documents are pre-fetched before rendering begins, there may be very little, if any, noticeable delay during the rendering procedure, even though the browser may determine the need for the child document during rendering. That is, the service worker 806 may have determined the need for the child document before the browser discovered the need during rendering. As noted, the determination and/or identification of ancillary web documents by a service worker may be extended to any number of related web documents. Accordingly, the benefits of intelligent pre-fetching in this manner may be cumulative. And the benefit may therefore be enjoyed by users who corresponding experience little or no delays when navigating via web clients (e.g., browsers) to web pages and/or other web resources.

VI. Example Operations

Figure 9:
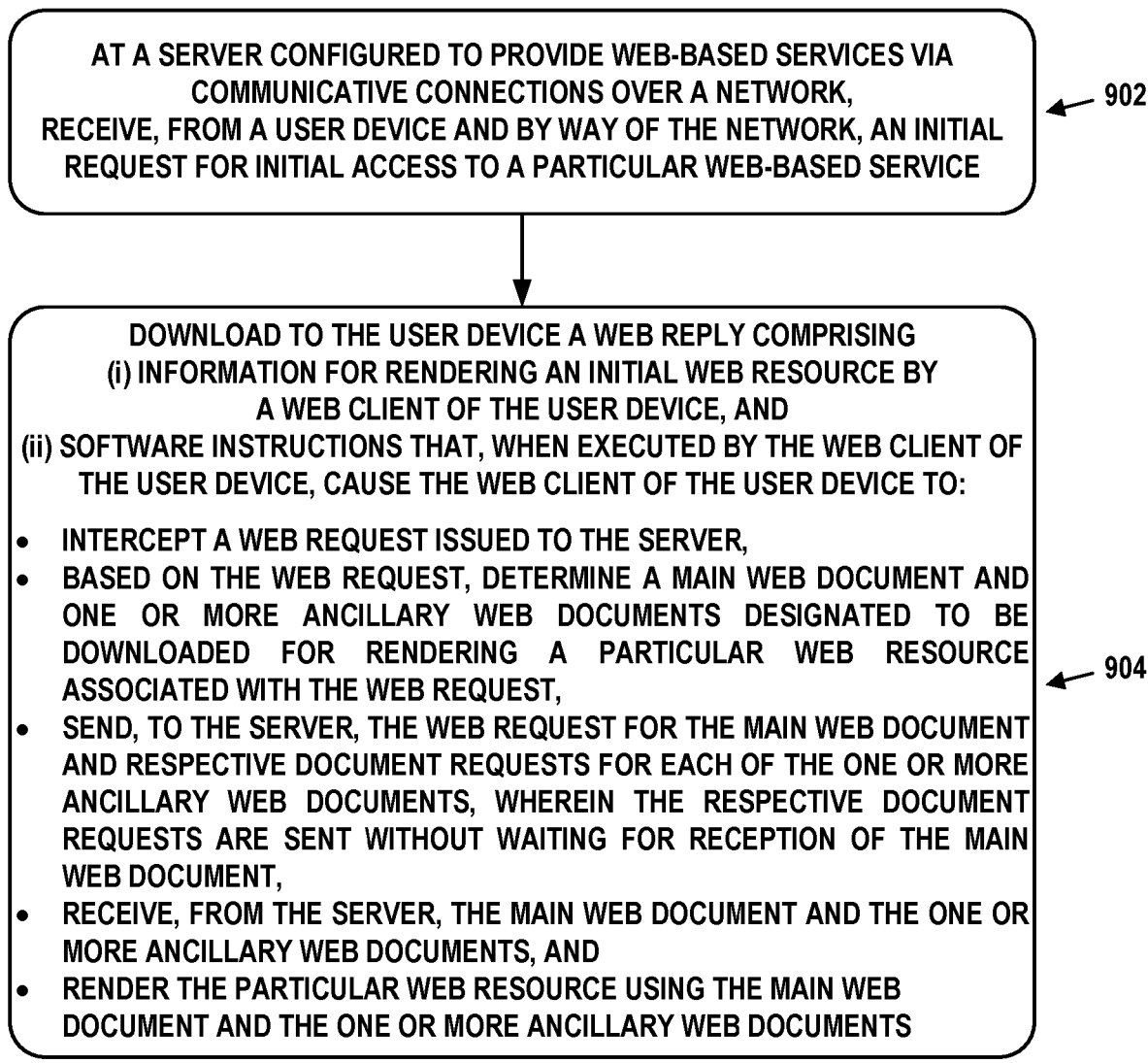
FIG. 9 is a flow chart, in accordance with example embodiments.

FIG. 9 is a flow chart illustrating an example embodiment. The process illustrated by FIG. 9 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 9 may be simplified by the removal of any one or more of the features shown therein. Further, these embodiments may be combined with features, aspects, and/or implementations of any of the previous figures or otherwise described herein.

In accordance with example embodiments, the example method illustrated in FIG. 9 may involve a server configured to provide web-based services via communicative connections over a network.

At block 902, the example method may involve receiving, from a user device and by way of the network, an initial request for initial access to a particular web-based service. As one non-limiting example, the initial request may be a user log-in to a website of a subscriber-based service, such as online access to a user account.

Then, at block 904, the example method may involve, responsive to the initial request, downloading to the user device a web reply including (i) information for rendering an initial web resource by a web client of the user device, and (ii) software instructions that, when executed by the web client of the user device, may cause the web client of the user device to carry out various operations. In particular, the downloaded software instructions may, when executed by the web client of the user device, may cause the web client of the user device to: intercept a web request issued to the server, based on the web request, determine a main web document and one or more ancillary web documents designated to be downloaded for rendering a particular web resource associated with the web request, send, to the server, the web request for the main web document and respective document requests for each of the one or more ancillary web documents, wherein the respective document requests are sent without waiting for reception of the main web document, receive, from the server, the main web document and the one or more ancillary web documents, and render the particular web resource using the main web document and the one or more ancillary web documents.

In accordance with example embodiments, the software instructions may be configured for causing the web client of the user device to carry out actions that may enhance the performance of subsequent communications between the web client and the server. In particular, the efficiency and/or pace of operations involving downloading web documents used or needed by the web client for rendering web resources may be enhanced. Thus, while the example method involves the server downloading software instructions to the web client of the user device, various aspects of the following description involve particular ways in which the software instructions are configured to instantiate the advantageous performance of the web client to which the instructions are downloaded.

In accordance with example embodiments, the software instructions, when executed by the web client of the user device, may further cause the web client of the user device to store the received one or more ancillary web documents in local cache memory of the web client. Execution of the software instructions may also cause the web client to retrieve any given ancillary web document of the one or more ancillary web documents from local cache memory of the web client in response to determining during a rendering procedure that the any given ancillary web document is needed for rendering the particular web resource.

In accordance with example embodiments, the software instructions, when executed by the web client of the user device, further cause the web client of the user device to execute the downloaded software instructions in a particular thread of operation different from each of one or more other threads of web client operations. In some embodiments, the particular thread of operation may be or include a service worker thread, and the downloaded software instructions may then be programming code specified according to a service worker application programming interface. Execution of the software instructions may also cause the web client to register the service worker thread with the web client.

In accordance with example embodiments, the software instructions, when executed by the web client of the user device, further cause the web client of the user device to execute the downloaded software instructions in a particular thread of operation different from each of one or more other threads of web client operations. With this arrangement, the web request issued to the server may be issued by one of the one or more other threads of web client operations, and execution of the software instructions may cause the web client to cause the particular thread of operation to intercept the web request issued by the one of the one or more other threads of web client operations.

In accordance with example embodiments, the web request may include a network address and particular resource information for accessing the particular web resource and the main web document. With this arrangement, execution of the software instructions may cause the web client to decode from the network address and particular resource information a further network address and further resource information for accessing at least one of the one or more ancillary web documents. In some embodiments, the network address and particular resource information may be or include a uniform record locator (URL), and the further network address and further resource information may be or include a URL.

In accordance with example embodiments, the web request may include a network address and particular resource information for accessing the particular web resource and the main web document. Additionally, the software instructions may include a list of respective network addresses and respective resource information for accessing at least one of the one or more ancillary web documents. With this arrangement, execution of the software instructions may cause the web client to look up, from the list, the respective network address and the respective resource information for accessing at least one of the one or more ancillary web documents. In some embodiments, the network address and particular resource information comprise a uniform record locator (URL), and the respective network addresses and further resource information may be or include a URL.

In accordance with example embodiments, each of the one or more ancillary web documents may be a respective child document of the main web document. With this arrangement, execution of the software instructions may cause the web client to determine each respective child document independently of identification of the respective child document during a procedure for rendering the main web document.

VII. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
a server configured to provide web-based services via communicative connections over a network; and
one or more processors configured to:
receive, from a user device and by way of the network, an initial request for initial access to a particular web-based service; and
responsive to the initial request, download to the user device a reply comprising (i) information for rendering an initial web resource by a web client of the user device, and (ii) software instructions that, when executed by the web client, cause the web client to:
intercept a web request issued to the server,
based on the web request, determine a main web document and one or more ancillary web documents designated to be downloaded for rendering a particular web resource associated with the web request,
send, to the server, the web request for the main web document and respective document requests for each of the one or more ancillary web documents, wherein the respective document requests are sent without waiting for reception of the main web document,
receive, from the server, the main web document and the one or more ancillary web documents, and
render the particular web resource using the main web document and the one or more ancillary web documents, wherein the software instructions, when executed by the web client of the user device, further cause the web client of the user device to:
  execute the downloaded software instructions in a particular thread of operation different from each of one or more other threads of web client operations,
  wherein the web request issued to the server is issued by one of the one or more other threads of web client operations,
  and wherein the software instructions that, when executed by the web client of the user device, cause the web client of the user device to intercept the web request issued to the server comprise particular software instructions that, when executed by the web client of the user device, cause the particular thread of operation to intercept the web request issued by the one of the one or more other threads of web client operations.

2. The system of claim 1, wherein the software instructions, when executed by the web client of the user device, further cause the web client of the user device to:
  store the received one or more ancillary web documents in local cache memory of the web client.

3. The system of claim 2, wherein the software instructions, when executed by the web client of the user device, further cause the web client of the user device to:
  retrieve any given ancillary web document of the one or more ancillary web documents from local cache memory of the web client in response to determining during a rendering procedure that the any given ancillary web document is needed for rendering the particular web resource.

4. The system of claim 1, wherein the particular thread of operation comprises a service worker thread, and the downloaded software instructions comprise programming code specified according to a service worker application programming interface,
  and wherein the software instructions, when executed by the web client of the user device, further cause the web client of the user device to register the service worker thread with the web client.

5. The system of claim 1, wherein the web request comprises a network address and particular resource information for accessing the particular web resource and the main web document,
  and wherein the software instructions that, when executed by the web client of the user device, cause the web client of the user device to determine the main web document and the one or more ancillary web documents based on the web request comprise particular software instructions that, when executed by the web client of the user device, cause the web client of the user device to:
  decode from the network address and particular resource information a further network address and further resource information for accessing at least one of the one or more ancillary web documents.

6. The system of claim 5, wherein the network address and particular resource information comprise a uniform record locator (URL),
  and wherein the further network address and further resource information comprise a URL.

7. The system of claim 1, wherein the web request comprises a network address and particular resource information for accessing the particular web resource and the main web document,
  wherein the software instructions include a list of respective network addresses and respective resource information for accessing at least one of the one or more ancillary web documents,
  and wherein the software instructions that, when executed by the web client of the user device, cause the web client of the user device to determine the main web document and the one or more ancillary web documents based on the web request comprise particular software instructions that, when executed by the web client of the user device, cause the web client of the user device to:
  look up, from the list, the respective network address and the respective resource information for accessing at least one of the one or more ancillary web documents.

8. The system of claim 7, wherein the network address and particular resource information comprise a uniform record locator (URL),
  and wherein the respective network addresses and further resource information comprise a URL.

9. The system of claim 1, wherein the each of the one or more ancillary web documents is a respective child document of the main web document,
  and wherein the software instructions that, when executed by the web client of the user device, cause the web client of the user device to determine the main web document and the one or more ancillary web documents based on the web request comprise particular software instructions that, when executed by the web client of the user device, cause the web client of the user device to:
  determine each respective child document independently of identification of the respective child document during a procedure for rendering the main web document.

10. A computer-implemented method comprising:
  at a server configured to provide web-based services via communicative connections over a network, receiving, from a user device and by way of the network, an initial request for initial access to a particular web-based service; and
  at the server, responsive to the initial request, downloading to the user device a web reply comprising (i) information for rendering an initial web resource by a web client of the user device, and (ii) software instructions that, when executed by the web client of the user device, cause the web client of the user device to:
    intercept a web request issued to the server,
    based on the web request, determine a main web document and one or more ancillary web documents designated to be downloaded for rendering a particular web resource associated with the web request,
    send, to the server, the web request for the main web document and respective document requests for each of the one or more ancillary web documents, wherein the respective document requests are sent without waiting for reception of the main web document,
    receive, from the server, the main web document and the one or more ancillary web documents, and
    render the particular web resource using the main web document and the one or more ancillary web documents,
  wherein the software instructions, when executed by the web client of the user device, further cause the web client of the user device to:
    execute the downloaded software instructions in a particular thread of operation different from each of one or more other threads of web client operations, wherein the web request issued to the server is issued by one of the one or more other threads of web client operations; and wherein the software instructions that, when executed by the web client of the user device, cause the web client of the user device to intercept the web request issued to the server comprise particular software instructions that, when executed by the web client of the user device, cause the particular thread of operation to intercept the web request issued by the one of the one or more other threads of web client operations.

11. The method of claim 10, wherein the software instructions, when executed by the web client of the user device, further cause the web client of the user device to:

store the received one or more ancillary web documents in local cache memory of the web client; and retrieve any given ancillary web document of the one or more ancillary web documents from local cache memory of the web client in response to determining during a rendering procedure that the any given ancillary web document is needed for rendering the particular web resource.

12. The method of claim 10, wherein the particular thread of operation comprises a service worker thread, and the downloaded software instructions comprise programming code specified according to a service worker application programming interface, and wherein the software instructions, when executed by the web client of the user device, further cause the web client of the user device to register the service worker thread with the web client.

13. The method of claim 10, wherein the web request comprises a network address and particular resource information for accessing the particular web resource and the main web document, and wherein the software instructions that, when executed by the web client of the user device, cause the web client of the user device to determine the main web document and the one or more ancillary web documents based on the web request comprise particular software instructions that, when executed by the web client of the user device, cause the web client of the user device to:

decode from the network address and particular resource information a further network address and further resource information for accessing at least one of the one or more ancillary web documents, wherein the network address and particular resource information comprise a uniform record locator (URL), and wherein the further network address and further resource information comprise a URL.

14. The method of claim 10, wherein the web request comprises a network address and particular resource information for accessing the particular web resource and the main web document, wherein the software instructions include a list of respective network addresses and respective resource information for accessing at least one of the one or more ancillary web documents, and wherein the software instructions that, when executed by the web client of the user device, cause the web client of the user device to determine the main web document and the one or more ancillary web documents based on the web request comprise particular software instructions that, when executed by the web client of the user device, cause the web client of the user device to:

look up, from the list, the respective network address and the respective resource information for accessing at least one of the one or more ancillary web documents, wherein the network address and particular resource information comprise a uniform record locator (URL), and wherein the respective network addresses and further resource information comprise a URL.

15. The method of claim 10, wherein the each of the one or more ancillary web documents is a respective child document of the main web document, and wherein the software instructions that, when executed by the web client of the user device, cause the web client of the user device to determine the main web document and the one or more ancillary web documents based on the web request comprise particular software instructions that, when executed by the web client of the user device, cause the web client of the user device to:

determine each respective child document independently of identification of the respective child document during a procedure for rendering the main web document.

16. An article of manufacture including a non-transitory computer-readable medium, having stored thereon program instructions that, upon execution by a computing system configured to provide web-based services via communicative connections over a network, cause the computing system to perform operations comprising:

receiving, from a user device and by way of the network, an initial request for initial access to a particular web-based service; and responsive to the initial request, downloading to the user device a web reply comprising (i) information for rendering an initial web resource by a web client of the user device, and (ii) software instructions that, when executed by the web client of the user device, cause the web client of the user device to:

intercept a web request issued to the computing system, based on the web request, determine a main web document and one or more ancillary web documents designated to be downloaded for rendering a particular web resource associated with the web request, send, to the computing system, the web request for the main web document and respective document requests for each of the one or more ancillary web documents, wherein the respective document requests are sent without waiting for reception of the main web document, receive, from the computing system, the main web document and the one or more ancillary web documents, and render the particular web resource using the main web document and the one or more ancillary web documents, wherein the software instructions, when executed by the web client of the user device, further cause the web client of the user device to:

execute the downloaded software instructions in a particular thread of operation different from each of one or more other threads of web client operations, wherein the web request issued to the server is issued by one of the one or more other threads of web client operations, and wherein the software instructions that, when executed by the web client of the user device, cause the web client of the user device to intercept the web request issued to the server comprise particular software instructions that, when executed by the web client of the user device, cause the particular thread of operation to intercept the web request issued by the one of the one or more other threads of web client operations.

17. The article of manufacture of claim 16, wherein the each of the one or more ancillary web documents is a respective child document of the main web document,
and wherein the software instructions that, when executed by the web client of the user device, cause the web client of the user device to determine the main web document and the one or more ancillary web documents based on the web request comprise particular software instructions that, when executed by the web client of the user device, cause the web client of the user device to:
determine each respective child document independently of identification of the respective child document during a procedure for rendering the main web document.

\* \* \* \* \*